(12) United States Patent
Motozawa et al.

(10) Patent No.: US 6,398,285 B2
(45) Date of Patent: Jun. 4, 2002

(54) OCCUPANT PROTECTIVE APPARATUS

(75) Inventors: Yasuki Motozawa; Yutaka Arimura, both of Saitama (JP)

(73) Assignee: Honda Giken Koygo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/732,489

(22) Filed: Dec. 6, 2000

(30) Foreign Application Priority Data

Dec. 6, 1999 (JP) ............................................ 11-346010

(51) Int. Cl.$^7$ ............................ B60R 21/00; B60N 2/02; B62D 21/00
(52) U.S. Cl. .............................. 296/68.1; 297/216.15; 297/216.18
(58) Field of Search ............................... 296/68.1, 189, 296/188, 65.02; 297/216.1, 216.15, 216.16, 216.18

(56) References Cited

U.S. PATENT DOCUMENTS

| | | | | |
|---|---|---|---|---|
| 2,959,446 A | * | 11/1960 | Thompson | 296/68.1 |
| 3,001,815 A | * | 9/1961 | Weber | 296/68.1 |
| 3,732,944 A | * | 5/1973 | Kendall | 180/274 |
| 3,858,930 A | * | 1/1975 | Calandra et al. | 296/68.1 |

(List continued on next page.)

FOREIGN PATENT DOCUMENTS

| | | | |
|---|---|---|---|
| DE | 3424-928 A | * | 1/1986 |
| DE | 4323543 C | * | 10/1994 |
| DE | 4415467 C1 | * | 11/1995 |
| DE | 19938940 A | * | 3/2000 |
| GB | 1043695 | | 9/1966 |
| GB | 2340801 A | | 3/2000 |
| GB | 2340802 A | | 3/2000 |
| JP | 5-238287 | | 9/1993 |
| JP | 5-246252 | | 9/1993 |
| JP | 5-246253 | | 9/1993 |
| JP | 7-101354 | | 4/1995 |
| JP | 7-205733 | * | 8/1995 |
| JP | 2000-62556 | | 2/2000 |
| WO | WO 94/22692 | | 10/1994 |
| WO | WO 98/40238 | | 9/1998 |

OTHER PUBLICATIONS

English Abstract of DE4415467C1, 2001.*
English Abstract of JP7–205733, 2001.*
Patent Abstracts of Japan, JP07101354A, 2001 http://www.1.ipdl.jpo.go.jp/PA1/cgi–bin/PA1INDEX.*
Patent Abstracts of Japan, JP2000062556, 2001 http://www1.ipdl.jpo.go.jp/PA1/cgi–bin/PA1INDEX.*

Primary Examiner—Joseph D. Pape
Assistant Examiner—Patricia Engle

(57) ABSTRACT

The occupant protective apparatus includes one or more seats 1 respectively supported on a car body so as to be movable along the direction of a force acting on the car body in the case of a car collision and each including a seat belt 3 for restricting an occupant 2 seated on the seat 1, a fluid container 14, the capacity of which can be reduced as the car body is deformed in the car collision, and a force generating unit 5 for applying a force to the seat 1 in the back-and-forth direction of the car body in response to generation of the pressure of fluid filled in the fluid container, such pressure generation occurring when the capacity of the fluid container is reduced. According to the present occupant protective apparatus, for example, in case where a forward running car collides head on with a structure on the road, the fluid container disposed in the front end portion of the car body is compressed and the fluid filled in the fluid container is thereby charged into the force generating unit such as a liquid pressure cylinder. Due to this, backward going acceleration is applied to the seat at the same time with the occurrence of the car head-on collision to thereby generate in the seat higher deceleration than the deceleration of the car body, which makes it possible to enhance the restricting force of the seat belt for restricting the forward movement of the occupant.

7 Claims, 5 Drawing Sheets

(List continued on next page.)

| | | | | |
|---|---|---|---|---|
| 3,897,101 A | * 7/1975 | Hess | 296/68.1 |
| 3,961,805 A | 6/1976 | Satzinger | 280/747 |
| 3,992,046 A | * 11/1976 | Braess | 296/68.1 |
| 3,998,291 A | 12/1976 | Davis | 180/91 |
| 4,156,472 A | * 5/1979 | Kunz | 177/25.13 |
| 4,832,409 A | * 5/1989 | Borlinghaus et al. | 297/468 |
| 4,881,781 A | * 11/1989 | Borlinghaus et al. | 297/473 |
| 5,167,421 A | * 12/1992 | Yunzhao | 297/216.18 |
| 5,286,085 A | * 2/1994 | Minami | 297/250.1 |
| 5,409,262 A | * 4/1995 | McLennan | 280/784 |
| 5,437,494 A | * 8/1995 | Beauvais | 297/216.19 |
| 5,626,203 A | * 5/1997 | Habib | 180/274 |
| 5,636,424 A | * 6/1997 | Singer et al. | 29/407.01 |
| 5,681,057 A | 10/1997 | Whirley et al. | 280/784 |
| 5,685,603 A | 11/1997 | Lane, Jr. | 297/216.11 |
| 5,746,467 A | 5/1998 | Jesdanont | 296/68.1 |
| 5,810,417 A | 9/1998 | Jesdanont | 296/68.1 |
| 5,947,543 A | 9/1999 | Hubbard | 296/68.1 |
| 6,003,937 A | 12/1999 | Dutton et al. | 297/216.1 |
| 6,042,190 A | 3/2000 | Mathe et al. | 297/483 |
| 6,092,853 A | 7/2000 | Hubbard | 296/68.1 |
| 6,116,561 A | 9/2000 | Christopher | 248/429 |
| 6,170,865 B1 | 1/2001 | Barron | 280/735 |
| 6,186,574 B1 | * 2/2001 | Motozawa et al. | 296/68.1 |
| 6,193,296 B1 | * 2/2001 | Motozawa et al. | 296/68.1 |
| 6,224,131 B1 | 5/2001 | Shammout | 296/68.1 |
| 6,227,563 B1 | 5/2001 | Talisman | 280/735 |
| 6,227,597 B1 | 5/2001 | Swann et al. | 296/68.1 |
| 6,254,164 B1 | * 7/2001 | Kawamura et al. | 296/68.1 |

* cited by examiner

OCCUPANT PROTECTIVE APPARATUS

BACKGROUND OF THE INVENTION

1. Field of the Invention

The present invention relates to an occupant protective apparatus and, in particular, to an occupant protective apparatus which is capable of reducing a deceleration to be applied to an occupant when a car collision occurs.

2. Description of the Related Art

Recently, in order to enhance the effect of occupant protection in a car collision, there have been proposed various car body structures in which the deforming mode of the other remaining portions of a car body than a car room portion of the car body in a car collision is set properly to thereby be able not only to reduce the deceleration of the car room portion of the car body but also to prevent the deformation of the other remaining portions of the car body from extending over to the car room portion of the car body (see JP-A-7-101354).

On the other hand, the deceleration of the occupant restricted to a seat by a seat belt can firstly start at the time when a forwardly going inertial force acting on the occupant in the car collision is received by the seat belt. Here, since the spring action of the seat belt cannot be removed, the inertial force causes the occupant to move forward and the deceleration of the occupant reaches its peak value at the time when the extension of the seat belt reaches its limit. It is generally said that the peak value of the occupant deceleration increases as the moving amount of the occupant due to the inertial force increases and, normally, the peak value of the occupant deceleration becomes higher than the average deceleration of the car room portion of the car body. Therefore, in order to reduce an impact to be given against the occupant due to the car collision, the deceleration of the car body must be adjusted in such a manner that a delay in the starting time of the occupant deceleration with respect to the car body deceleration can be minimized.

However, it is substantially impossible to connect the occupant to the car body as an integral unit and, especially, in the case of a compact car in which it is difficult to secure a sufficient stroke in the other remaining portions of the car body than the car room portion thereof, it is difficult to reduce the occupant deceleration further simply using a conventional occupant protecting method in which the deceleration of the car room portion in a car collision is reduced by properly setting the deforming mode of the car body.

SUMMARY OF THE INVENTION

The present invention aims at eliminating the drawbacks found in the above-mentioned conventional occupant protective apparatus. Accordingly, it is an object of the invention to provide an occupant protective apparatus which can reduce not only the size of the car body but also the deceleration of the occupant at a further higher dimension.

In attaining the above object, according to the invention, there is provided an occupant protective apparatus, including: at least one seat supported on a car body to be movable along a direction of a force acting on said car body in the case of a car collision, the seat respectively including a seat belt for restricting an occupant seated thereon; a first fluid container, the capacity of which is reduced in conjunction with the deformation of the car body in the car collision; and a first force generating unit applying to the at lest one seat, a force directed to the backward of the car body in response to the pressure occurring by fluid filled in said fluid container when the capacity thereof is reduced.

According to the present occupant protective apparatus, for example, in case where a forward running car collides head on with a structure on the road, the fluid container disposed in the front end portion of the car body is compressed and the fluid filled in the fluid container is thereby charged into the force generating means such as a liquid pressure cylinder. Due to this, backward going acceleration is applied to the seat at the same time with the occurrence of the car head-on collision to thereby generate in the seat higher deceleration than the deceleration of the car body, which makes it possible to enhance the restricting force of the seat belt for restricting the forward movement of the occupant.

Especially, the present occupant protective apparatus may further include second force generating means for applying a forward going force to the seat after the above-mentioned backward going force is applied. That is, in case where a forward going force is applied to the seat with a proper time delay, an increase in a forward going inertial force acting on the occupant in the car collision can be controlled, so that the deceleration of the car body and the deceleration of the seat and occupant can be made equal to each other in the early stage of the car collision.

DETAILED DESCRIPTION OF THE PREFERRED EMBODIMENTS

Now, a description will be given below in detail of the invention with reference to preferred embodiments of an occupant protective apparatus according to the invention shown in the accompanying drawings.

Figure 1:
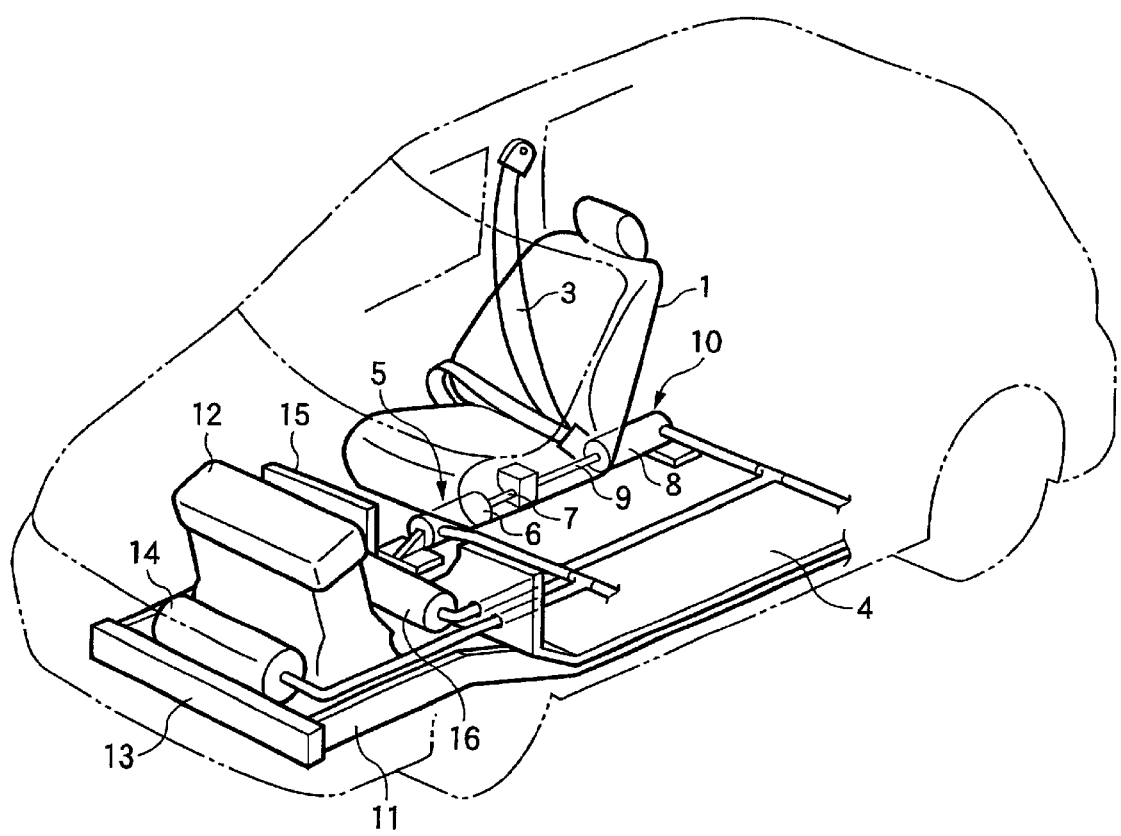
FIG. 1 is a schematic perspective view of a car body to which a first embodiment of an occupant protective apparatus according to the invention is applied.
Figure 2:
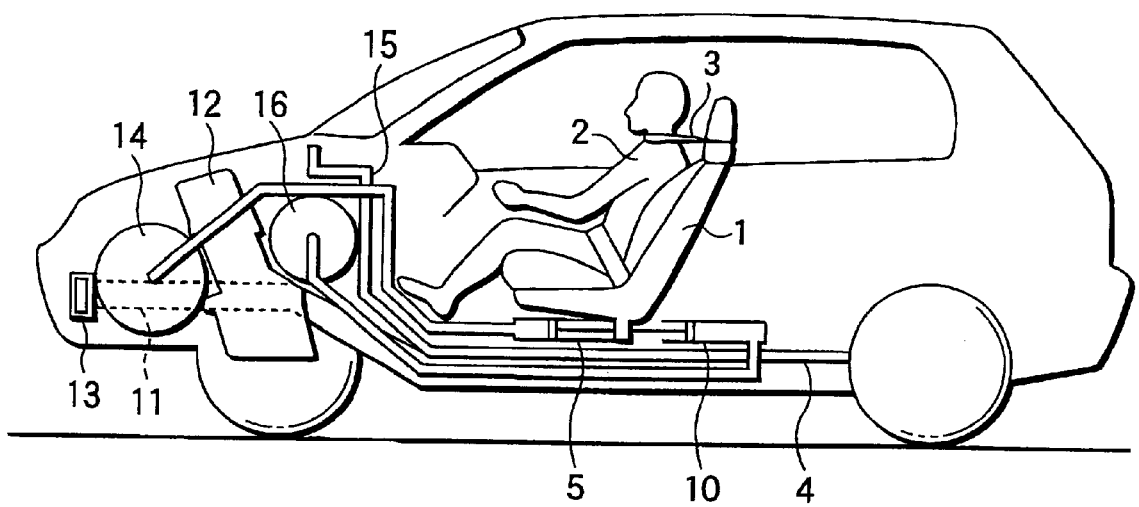
FIG. 2 is a schematic structure view of the car body to which the first embodiment of the invention is applied, showing a state thereof before a car collision occurs.

FIGS. 1 and 2 respectively show of a schematic structure of a car to which is applied a first embodiment of an occupant protective apparatus according to the invention. In the present embodiment, in order to restrict the movement of an occupant 2 with respect to a seat 1, a seat belt 3 is connected to the seat 1. And, the seat 1 is mounted on a seat slide rail (not shown) in such a manner that it can be moved by a certain distance along the advancing direction of the car with respect to a floor 4 which forms part of a car room portion of a car body.

Below the seat 1, there is disposed a first cylinder device 5 which is used to generate a drive force for moving the seat 1 backward. This first cylinder device 5 includes a cylinder 6 fixed to the floor 4 and a piston rod 7 for connecting a piston slidably disposed within the cylinder 6 to the seat 1. The first cylinder device 5 is arranged such that it can generate a thrust in the axial direction thereof using fluid pressure.

In the rear of the seat 1, there is disposed a second cylinder device 10 which, similarly to the above-mentioned first cylinder device 5, includes a cylinder 8 fixed to the floor 4 and a piston rod 9 for connecting a piston slidably disposed within the cylinder 8 to the seat 1. The second cylinder device 10 is also arranged such that it can generate a thrust in the axial direction thereof using fluid pressure. This second cylinder device 10 is used to generate a drive force for pushing the seat 1, which has been moved backward by a drive force generated by the first cylinder device 5, back to the forward direction. The first cylinder device 5 is normally held in a contracted state, whereas the second cylinder device 10 is normally held in an expanded state.

On a car body structure including a front side member 11 which is formed integral with the floor 4, there is supported an engine 12. And, a first fluid tank 14 is interposed between the front portion of the engine 12 and the rear portion of a front bumper beam 13. The first fluid tank 14, preferably, may be disposed as near as possible to both of the engine 12 and front bumper beam 13.

At a position, which exists within an engine room and between the engine 12 and a front dashboard 15, there is arranged a second fluid tank 16. This second fluid tank 16, preferably, may also be disposed as near as possible to both of the engine 12 and dashboard 15.

These first and second fluid tanks 14, 16, in a car collision, can be both compressed due to the deformation of the engine room and the capacities thereof can be thereby reduced; but, the two fluid tanks 14, 16 are structured such that they are prevented from being broken in such car collision.

The first fluid tank 14 is connected to the cylinder bottom of the first cylinder device 5 by a pipe. And, the second fluid tank 16 is connected to the cylinder bottom of the second cylinder device 10 by a pipe. The pipes, which are used to connect together the two cylinder devices 5, 10 and the two fluid tanks 14, 16, are structured such that they do not cause any pressure loss but have such strength as can hold the pressure which is generated in the car collision.

The fluid that is filled into the two fluid tanks 14, 16 must withstand long storage as well as must be able to transmit quickly variations in the capacities and pressures of the respective fluid tanks 14, 16. Therefore, as such fluid, preferably, there may be used non-compressible fluid which has stable physical properties, for example, brake liquid.

Figure 3A:
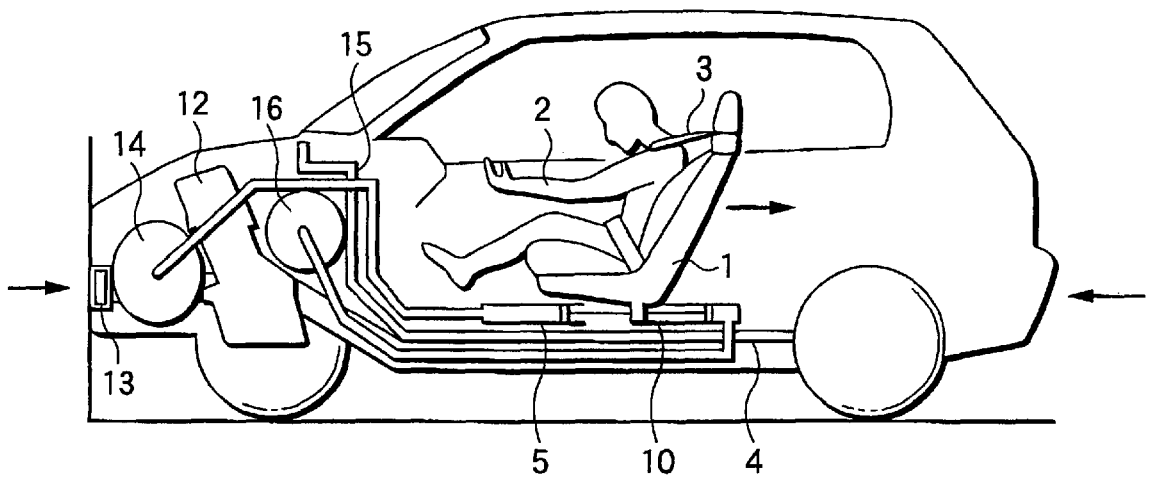
FIGS. 3A to 3C are explanatory views of a process in the first embodiment when the car collision occurs.

Next, a description will be given below of the operation of the occupant protective apparatus of the invention with reference to FIGS. 3A and 4, assuming a case in which a car is collided head on with a structure on the road.

Just at the same time when the car collision occurs, the front side member 11, which is formed integral with the floor 4 and extended forwardly from the floor 4, starts to buckle and deform due to an impact load applied to the front bumper beam 13. At the then time, the floor 4 continues its forward movement by an amount contracted due to the plastic deformation of the front side member 11, while receiving deceleration due to a deforming stress produced in the front side member 11.

On the other hand, in the engine 12, generally, an elastic member is included in the mounting portion of the engine 12, so that the engine 12 is rather going to continue moving forward due to its inertial force. This narrows quickly the distance between the engine 12 and front bumper beam 13 to thereby compress the first fluid tank 14 interposed between them and, due to the reduction of the capacity of the first fluid tank 14, the fluid stored within the first fluid tank 14 is pushed out into the first cylinder device 5. Due to the pressure of this fluid, the piston rod 7 of the first cylinder device 5 is pushed out from the first cylinder device 5, so that the seat 1 connected to the piston rod 7 is accelerated backward (see FIG. 3A). At the then time, owing to the thrust of the first cylinder device 5, the piston rod 9 of the second cylinder device 10 is pushed in the contracting direction thereof. That is, due to this, the seat 1 is moved backward with respect to the floor 4, with the result that there is generated in the seat 1 a deceleration which is larger than the deceleration of the floor 4, that is, the deceleration of the car room portion of the car body (in FIG. 4, an area shown by a).

During the above process, the occupant 2 is going to continue its forward movement due to an inertial force thereof with respect to the car body (in particular, the car room portion thereof) which is going to stop due to the car collision. However, since backward going acceleration is applied to the seat 1 at the same time when the car collision occurs, by the seat belt 3 formed integral with the seat 1, the occupant 2 is instantaneously restricted to the seat 1 while generating little relative speed with respect to the floor 4.

Figure 3B:
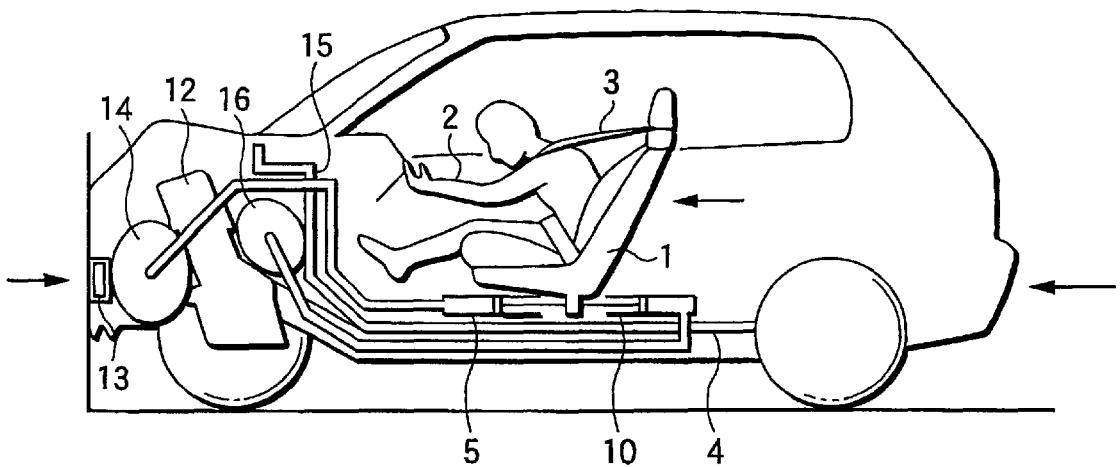

In case where the front side member 11 continues its deformation and the engine 12 moves backward, the distance between the engine 12 and front dashboard 15 is narrowed and the second fluid tank 16 is thereby pressed, so that the fluid from the second fluid tank 16 is pushed out into the second cylinder device 10. Here, although the second cylinder device 10 is contracted due to the above-mentioned backward movement of the seat 1, whereas, in case where the pressure from the second fluid tank 16 is applied to the second cylinder device 10, the piston rod 9 is pushed out from the second cylinder device 10 (see FIG. 3B). As a result of this, the deceleration of the seat 1 is reduced (in FIG. 4, an area shown by b), while an increase in the forward inertial force applied to the occupant 2 in the early stage of the car collision reaches its peak value so that the inertial force of the occupant 2 can be made constant instantaneously.

Figure 3C:
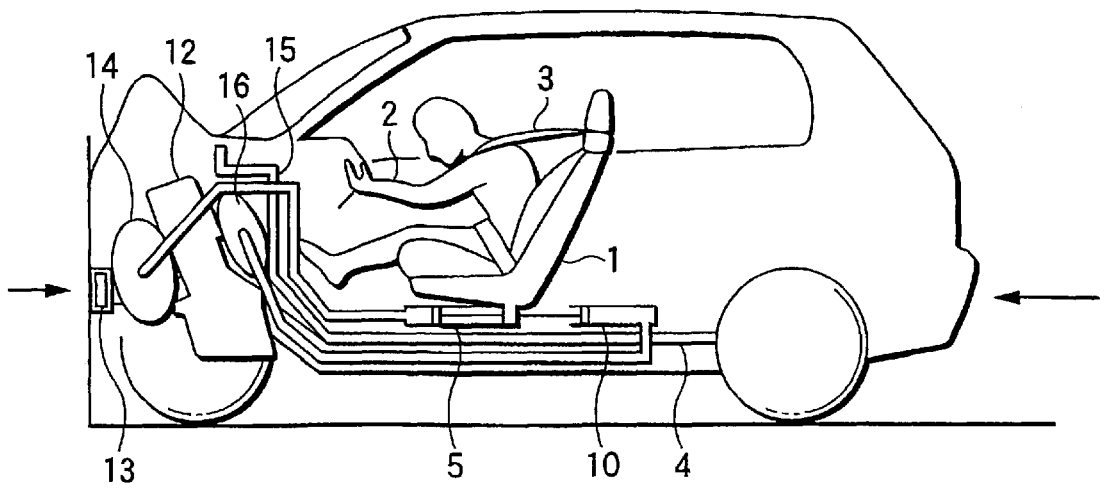
Figure 4:
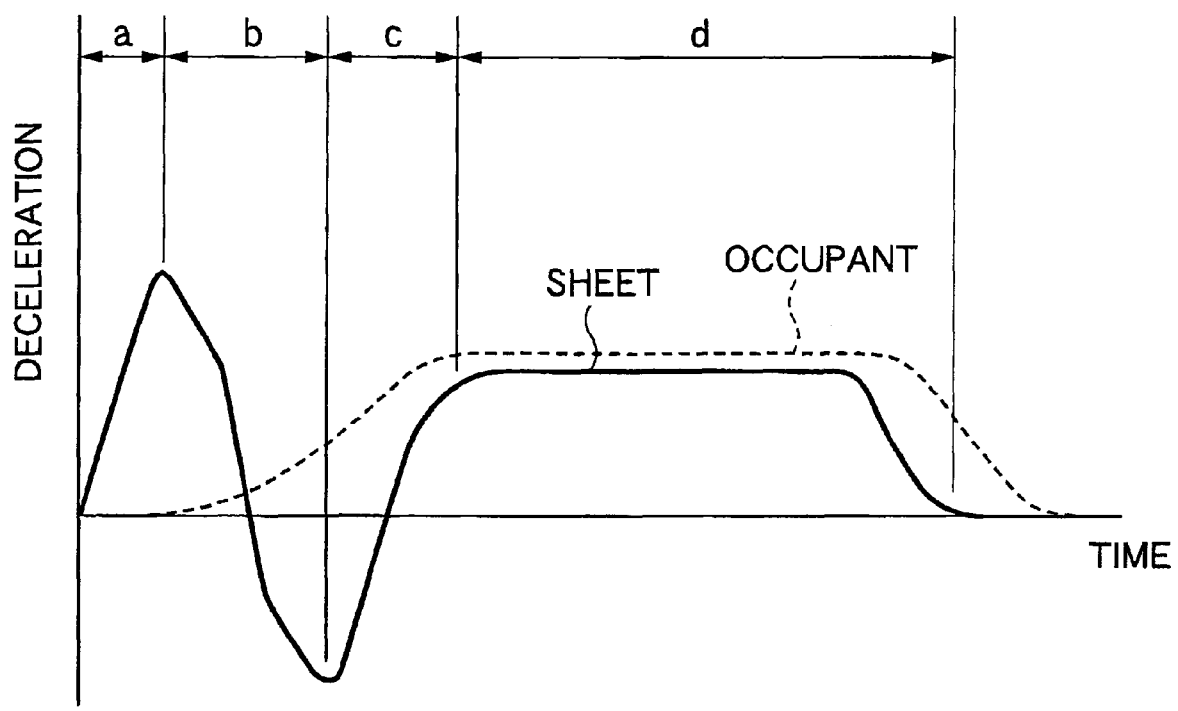
FIG. 4 is a graphical representation of a deceleration waveform obtained when the car collision occurs; and, FIGS. 5A to 5C are explanatory views of a process carried out in a second embodiment of an occupant protective apparatus according to the invention when a car collision occurs.

In the late stage of the car collision, just at the same time when the pressures respectively from the two fluid tanks 14, 16 become equal to each other and the piston rods 7, 9 of the two cylinder devices 5, 10 are thereby caused to stop, the deceleration of the seat 1 increases (in FIG. 4, an area shown by c). After then, the seat 1 and floor 4 continue their deceleration as an integral unit with the deceleration that is determined by the deforming stress of the front side member 11. Also, in this state, because, as described above, the relative speed between the occupant 2 and floor 4 is zero, and also because the restricting load of the seat belt 3 balances well with the deceleration of the car body, the occupant 2 continues its deceleration integrally with the floor 4 (see FIG. 3C). In this state, the deceleration of the occupant is equal to the deceleration of the car body until the car body is caused to stop perfectly (in FIG. 4, an area shown by d).

To reduce the impact given to the occupant 2 in the car collision, firstly, it is important to reduce the deceleration of the occupant. In view of this, as described above, in case where there is set a deceleration waveform (which is shown by a solid line in FIG. 4) in which, in the early stage of the car collision, there is generated higher deceleration than the average deceleration of the car body in the seat 1 and seat belt 3 for a short period of time, next, there is generated oppositely going acceleration in the seat 1 and seat belt 3 for a short period of time, and, after then, the seat 1 and seat belt 3 are allowed to decelerate with the average car body deceleration, when compared with a car which does not incorporate therein the present occupant protective apparatus, the deceleration of the occupant can be reduced in such a manner as shown by a broken line in FIG. 4, assuming that the respective car bodies of the two cars are deformed in the same amount.

In order to enhance the effects of the invention structured in the above-mentioned manner, preferably, the strength of the front side member 11, the elastic characteristic of the seat belt 3, the output characteristics of the two cylinder devices 5, 10, the deforming timings of the two fluid tanks 14, 16, and the moving amount of the seat 1 may be set properly such that, at the time when the relative speed between the seat 1 and floor 4 becomes zero and the deceleration of the seat 1 and the deceleration of the floor 4 are equal to each other, the relative speed between the occupant 2 and floor 4 can approach zero as much as possible and the restricting load of the seat belt 3 can balance as equally as possible with the car body deceleration in the late stage of the car collision.

Figure 5A:
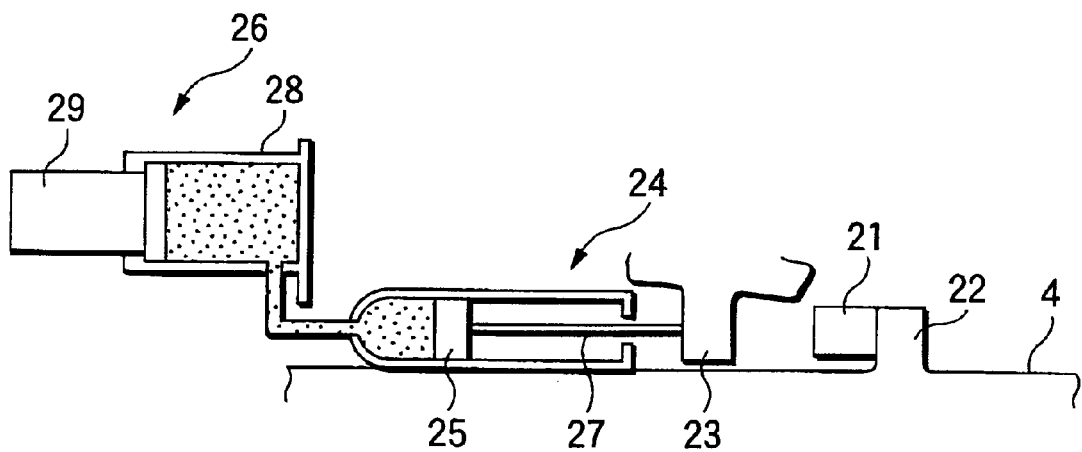
Figure 5B:
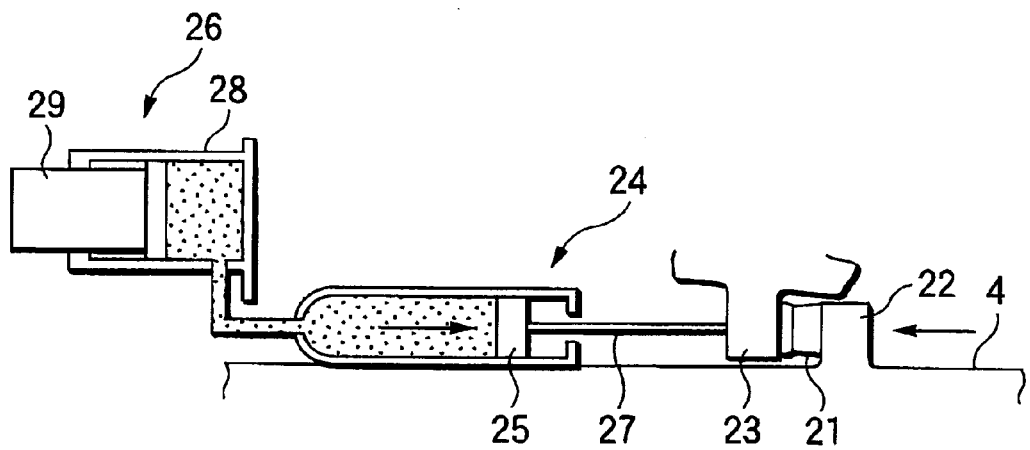
Figure 5C:
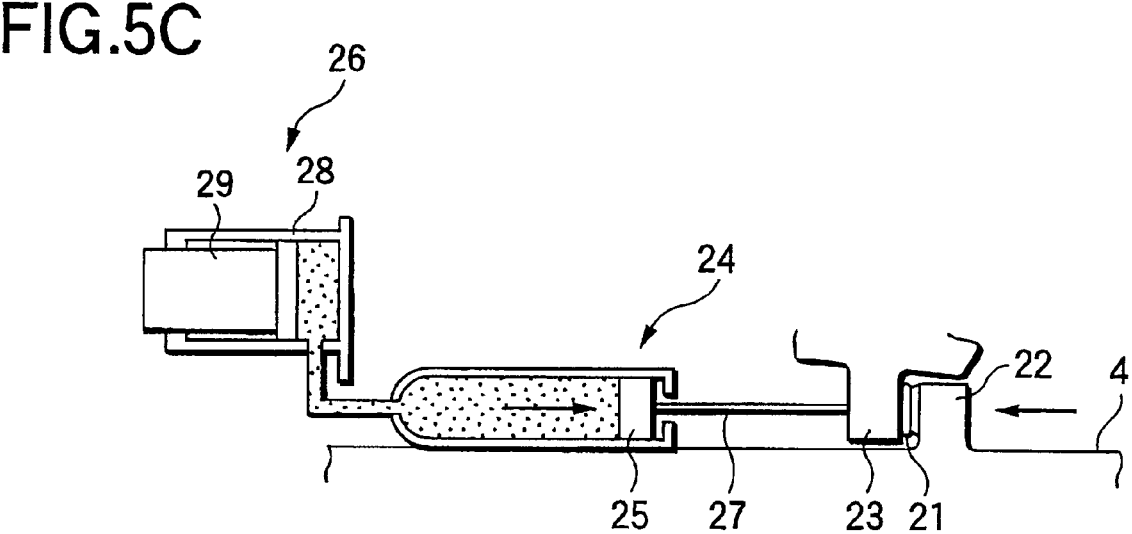

Now, FIGS. 5A to 5C show a second embodiment of an occupant protective apparatus according to the invention. In the present embodiment, a stopper 21 for restricting the backward movement of a seat 1 is disposed on a rigid projecting portion 22 formed integral with a floor 4 which continues its forward movement when a car collision occurs. This stopper 21 is structured in the following manner: that is, when a piston 25 (FIG. 5A), which is disposed in a cylinder device 24 connected between the floor 4 and the support base 23 of the seat 1 and is situated on the bottom side of the cylinder device 24 before the car collision occurs, is moved toward the top side of the cylinder device 24 due to the fluid pressure that is generated by a fluid container 26 in the car collision, the stopper 21 is plastically deformed due to the thrust that is applied to the seat support base 23 through a piston rod 27, thereby generating a reaction load (FIGS. 5B and 5C). As a result, the reaction load generated by the stopper 21 at the then time accelerates the seat 1 forward with respect to the floor 4 (which corresponds to an area shown by b in FIG. 4). That is, similarly to the previously described first embodiment, the piston 25 of the cylinder device 24 is decelerated by this reaction load and a forward going force is applied to the seat 1.

By the way, the fluid container 26, which is used to apply the thrust to the cylinder device 24, may be structured such that it can be compressed with the deformation of the car body and the capacity thereof is reduced, or, as schematically shown in FIGS. 5A to 5C, it may be composed of a combination of a cylinder 28 and a ram 29.

While only certain embodiments of the invention have been specifically described herein, it will apparent that numerous modifications may be made thereto without departing from the spirit and scope of the invention.

As has been described heretofore, according to the invention, the seat with a seat belt is accelerated in the acting direction of the collision load by the first force generating means in the early stage of the car collision to thereby generate the higher deceleration than the car body deceleration in the seat and seat belt, next, the acceleration going in the opposite direction to the above deceleration is generated by the second force generating means in the seat and seat belt to thereby make constant the inertial force of the occupant going to move forward in the early stage of the car collision, and, after then, the deceleration of the car body and the deceleration of the seat and occupant can be made equal to each other. Thanks to this, a deceleration waveform preferable for reduction of the occupant deceleration can be generated in the seat and seat belt, which makes it possible to reduce greatly the peak value of the occupant deceleration with a smaller car body deforming amount than in the conventional occupant protective apparatus. Also, since the moving amount of the occupant within the car room with respect to the car body can be minimized, it is possible to reduce the possibility of a secondary collision in which the occupant can be butted against structures existing within the car room and can be thereby damaged.

What is claimed is:

1. An occupant protective apparatus, comprising:
   at least one seat supported on a car body to be movable along a direction of a force acting on the car body in the case of a car collision, said seat including a seat belt for restricting an occupant seated thereon;
   a first fluid container, the capacity of which is reduced in conjunction with the deformation of the car body in the car collision;
   a first force generating unit for applying to said at least one seat a force directed to the backward of the car body in response to the pressure occurring by fluid filled in said first fluid container when the capacity thereof is reduced; and
   a second force generating unit for applying to said at least one seat a force directed to the forward of the car body after the force directed to the backward thereof is applied to said seat by said first force generating unit.

2. The occupant protective apparatus, according to claim 1, wherein said first fluid container is a first fluid tank disposed between a front bumper beam and an engine.

3. The occupant protective apparatus, according to claim 1, wherein said first force generating unit is a first cylinder device including:
   a first cylinder disposed on a car body side;
   a first piston slidable with said first cylinder; and
   a first piston rod connected to said first piston and said seat such that said seat moves toward the backward of the car body in the car collision, and
   wherein said first fluid container is connected to said first cylinder by a pipe.

4. The occupant protective apparatus, according to claim 1, wherein said first fluid container includes a cylinder for receiving the fluid and a ram for pressing the fluid within said cylinder.

5. The occupant protective apparatus, according to claim 1, further comprising:
   a second fluid container, the capacity of which is reduced in conjunction with the deformation of said car body in the car collision,
   wherein said second force generating unit is a second cylinder device including:
   a second cylinder disposed on a car body side;
   a second piston slidable within said cylinder; and
   a second piston rod connected to said piston and said seat for causing said seat to move toward the forward of the car body in the car collision,
   wherein said second fluid container is connected to said second cylinder by a pipe.

6. The occupant protective apparatus according to claim 5, wherein said second fluid container is a second fluid tank disposed between an engine and a front dashboard.

7. The occupant protective apparatus according to claim 1, wherein said second force generating unit is a deformable member being plastically deformable by a thrust applied to said seat in the car collision.

* * * * *